(12) United States Patent
Fintel

(10) Patent No.: US 6,704,580 B1
(45) Date of Patent: Mar. 9, 2004

(54) CELLULAR TELEPHONE DOCKING SYSTEM

(75) Inventor: James Steven Fintel, Spring, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/524,715

(22) Filed: Mar. 14, 2000

(51) Int. Cl.$^7$ ................................. H04M 1/00
(52) U.S. Cl. ................... 455/550.1; 455/553.1; 455/3.04
(58) Field of Search ................ 455/550, 557, 455/569, 572, 575, 561, 418, 419, 420, 567, 550.1, 552.1, 553.1, 574, 575.1, 3.04, 3.06

(56) References Cited

U.S. PATENT DOCUMENTS

| | | | |
|---|---|---|---|
| 5,499,287 A | * 3/1996 | Beck et al. ............ 379/100.01 |
| 5,689,549 A | * 11/1997 | Bertocci et al. ............ 455/410 |
| 5,715,296 A | * 2/1998 | Schornack et al. ......... 455/403 |
| 5,774,793 A | * 6/1998 | Cooper et al. .............. 455/418 |
| 5,881,139 A | * 3/1999 | Romines ................ 379/114.02 |
| 5,933,774 A | * 8/1999 | Bertocci ..................... 455/417 |
| 5,995,594 A | * 11/1999 | Shaffer et al. ............. 379/67.1 |
| 6,038,451 A | * 3/2000 | Syed et al. ................. 455/445 |
| 6,044,267 A | * 3/2000 | Foladare et al. ............ 455/426 |
| 6,073,031 A | * 6/2000 | Helstab et al. ............. 455/418 |
| 6,088,598 A | * 7/2000 | Marsolais .................... 455/414 |
| 6,163,702 A | * 12/2000 | Anderson et al. ........... 455/458 |
| 6,185,194 B1 | * 2/2001 | Musk et al. ................. 370/260 |
| 6,192,236 B1 | * 2/2001 | Irvin .......................... 455/420 |
| 6,208,724 B1 | * 3/2001 | Fritzinger et al. ...... 379/201.01 |
| 6,240,297 B1 | * 5/2001 | Jadoul ........................ 455/466 |
| 6,243,574 B1 | * 6/2001 | McGregor et al. ...... 379/114.01 |
| 6,308,070 B1 | * 10/2001 | Laster ......................... 455/406 |
| 6,327,479 B1 | * 12/2001 | Mikkola ..................... 455/466 |
| 6,343,220 B1 | * 1/2002 | Van Der Salm ............ 455/552 |
| 6,556,826 B1 | * 4/2003 | Johnson et al. ............. 455/450 |

FOREIGN PATENT DOCUMENTS

WO   WO 9858454 A2 * 12/1998 ............ H04B/1/38

OTHER PUBLICATIONS

Vox 2, *Cell Phone Base Station*, http://www.vox2.com, Copyright 2000 (first publication date unknown).

Andrew Wireless Products, Advertisement for product "Extensis for Motorola Phones," published on Amazon.com at http://www.amazon.com/exec/obidos/tg/stores/detail/–/wireless/B00005IBUM/qid. Published at least as early as Aug. 12, 2001.

* cited by examiner

*Primary Examiner*—Cong Van Tran
(74) *Attorney, Agent, or Firm*—Trop, Pruner & Hu, P.C.

(57) ABSTRACT

A docking station includes connectors and a circuit. Each connector receives a different cellular telephone, and the circuit establishes communication between at least one of cellular telephones and a wired telephone device of a wired telephone network.

25 Claims, 7 Drawing Sheets

CELLULAR TELEPHONE DOCKING SYSTEM

BACKGROUND

The invention generally relates to a cellular telephone docking system.

A cellular telephone may be used to perform an ever increasing number of functions, such as voice communications, Internet browsing and the communication of electronic mail, or e-mail. In addition to these features, the cost of using a cellular telephone for long distance purposes is decreasing, due to the contract plans that are available from most cellular service providers. As a result of these factors, a cellular telephone may be used in places where wired telephone systems are present, such as at a place of business or home. However, there may be some inconveniences that are associated with a cellular telephone. For example, despite its ever decreasing size, it may be inconvenient to carry a cellular telephone where wired telephones are present, even though the wired telephones may not offer some of the convenient features or rates that are available with the cellular telephone. As another example of an inconvenience, the cellular telephone adds another telephone number to the ever increasing list of telephone numbers that the cellular its customer may have. For example, a typical cellular telephone customer has many telephone numbers: one telephone number for at least one cellular telephone and other telephone numbers for wired telephones at the customer's office and home.

Thus, there is a continuing need for an arrangement that addresses one or more of the problems that are stated above.

DETAILED DESCRIPTION

Figure 1:
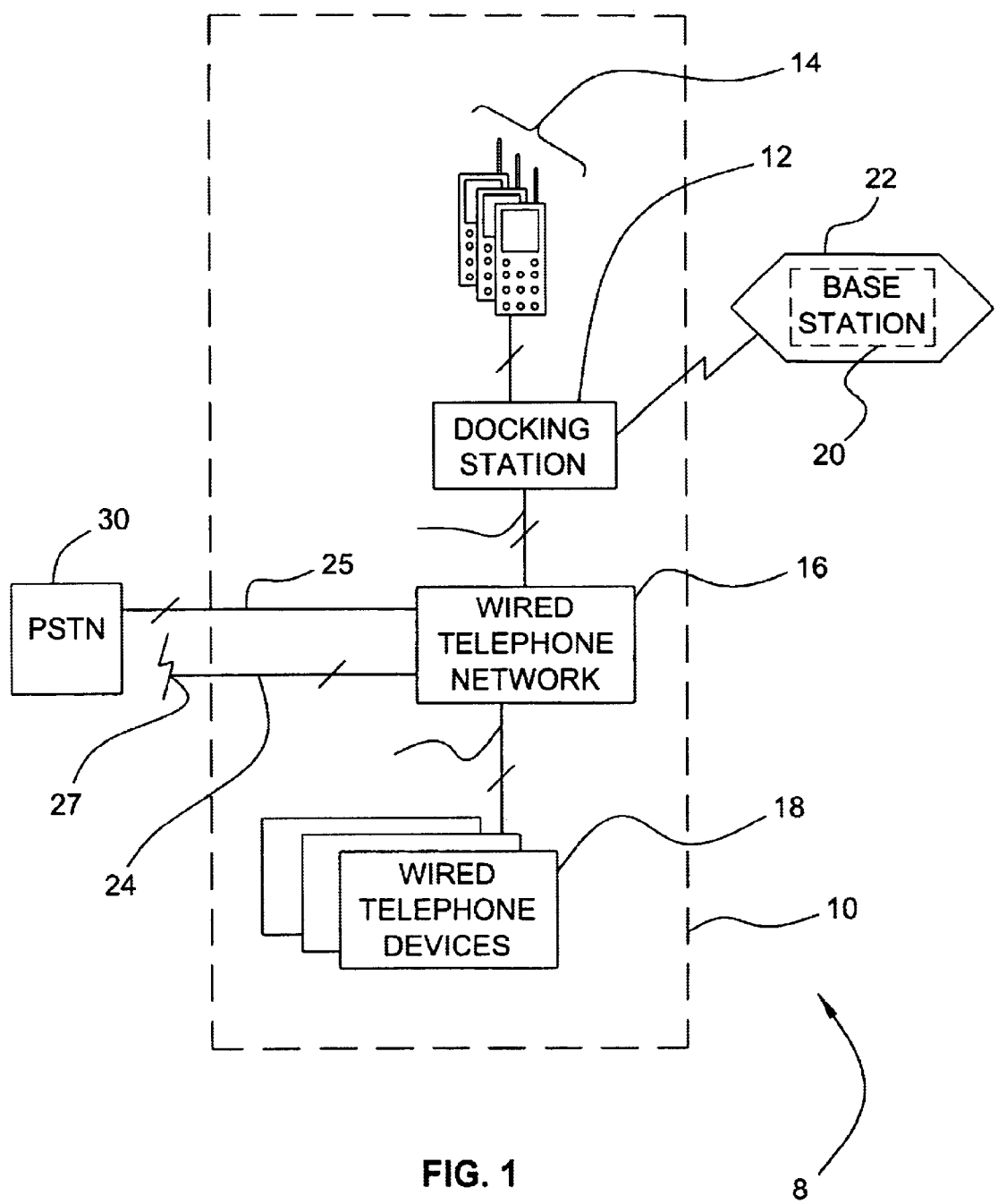
FIG. 1 is a schematic diagram of a telephony system according to an embodiment of the invention.

Referring to FIG. 1, an embodiment 8 of a telephony system in accordance with the invention includes a local telephone system 10 for the home or office and a cellular base station that is associated with a cell 22 that is in proximity to the local telephony system 10. Unlike conventional local telephony systems 10, the system 10 includes a cellular telephone docking station 12 that integrates the use of both cellular telephones 14 and wired telephone devices 18 (wired telephones, modems, facsimile machines, etc.). In this manner, the local telephony system 10 includes a wired telephone network 16 that couples the wired telephone devices 18 and the cellular telephone docking station 12 together. Due to this arrangement, the docking station 12 may serve as a gateway for establishing communication between the wired telephone devices 18 and the cellular base station 20.

Figure 2:
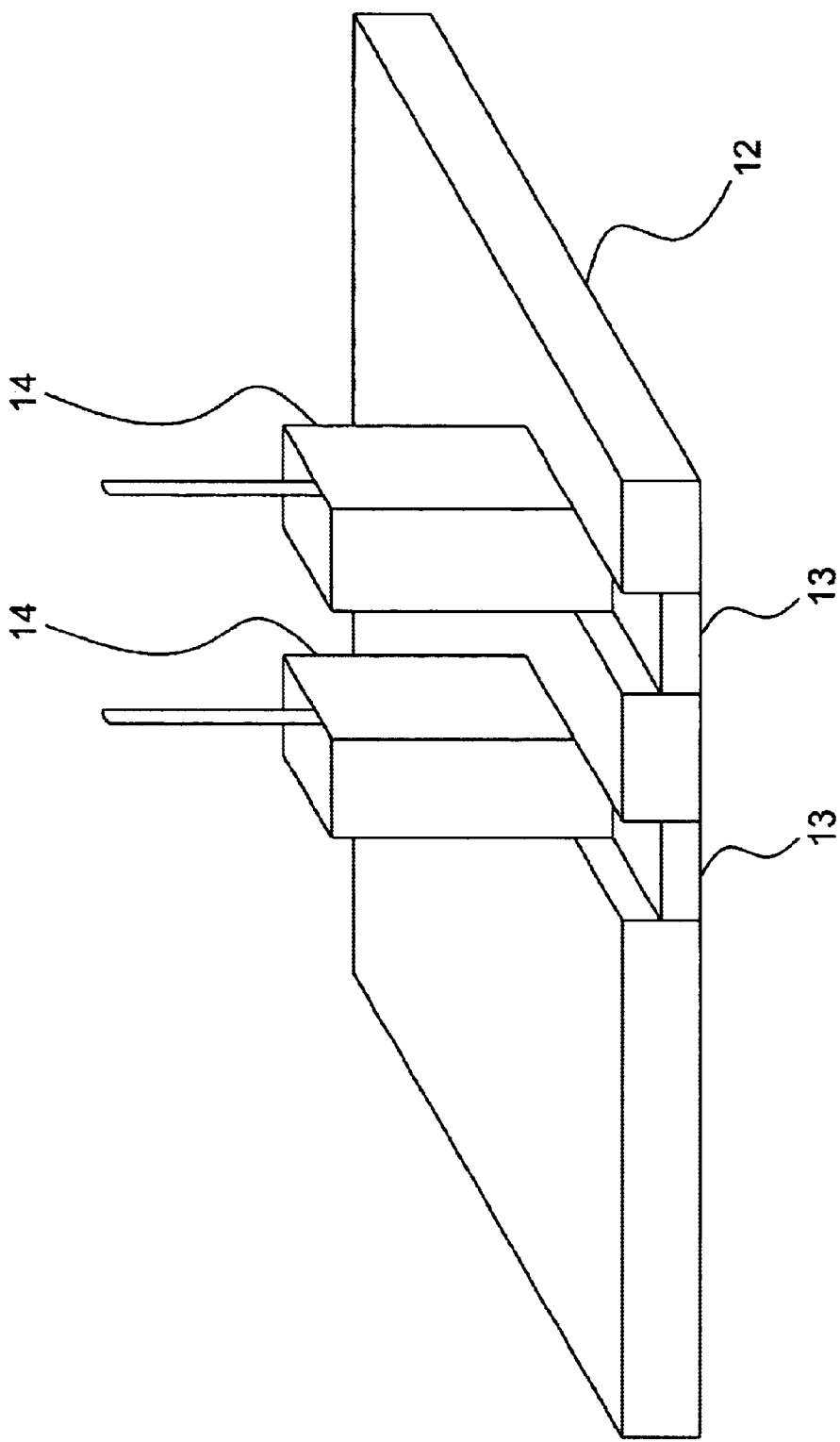
FIG. 2 is a perspective view of a docking station of the system of FIG. 1 according to an embodiment of the invention.

To accomplish this, the cellular docking station 12 includes docking bays 13 (see also FIG. 2) to receive and electrically connect cellular telephones 14 to the local telephony system 10. Each cellular telephone 14, when docked, provides a different incoming channel to receive an incoming call and/or to provide a channel for an outgoing call.

More particularly, in some embodiments of the invention, each wired telephone device 18 may be plugged into the wired telephone network 16 via a telephone wall jack (an RJ-11 jack, for example) that couples the wired telephone device 18 to one of several outside telephone lines 24. When used in an office, the wired telephone network 16 may include a PBX system that includes analog ports to form connections with the external telephone lines 24 and digital ports that form connections with the various extensions of the PBX system. In this manner, each extension is connected to one of the wired telephone devices 18.

Regardless of the type or structure of the wired telephone network 16, in some embodiments of the invention, the wired telephone devices 18 do not communicate outside of the local telephony system 10 via the external telephone lines 24. In this manner, in some embodiments of the invention, the wired telephone devices 18 may communicate with a public switched telephone network (PSTN) 30 via other external telephone lines 25. Instead of using the telephone lines 24 for communication outside of the local telephony system 10, the wired telephone devices 18 use the channels that are established by the docked cellular telephones 14. Thus, this arrangement is unlike conventional wired systems in which the external telephone wires 24 are connected to the PSTN 30 at a demarcation point 27.

It is noted that the wired telephone network 16 may be used for purposes of establishing communications between the wired telephone devices 18. For example, in a typical office environment, a wired telephone device 18 that is coupled to one extension may be used to communicate with another wired telephone device 18 that is coupled to another extension. In this manner, the wired telephone device 18 at one extension may be picked up to enter a command to remove the dial tone. The wired telephone device 18 may then, for example, dial the number of another extension and may, for example, enter the appropriate code to set up a conference call that includes two or more extensions of the wired telephone network 16. Similarly, for a residential setting, two telephones wired devices 18 may be lifted off hook to communicate with each other and possibly communicate with telephone devices that are external to the local telephony system 10.

As an example, family members that live in same house may use the docking station 12 in the following manner. Each family member may have their own associated cellular telephone 14 and a corresponding cellular telephone number. It is noted that the place of residence may not have telephone numbers that are assigned to the external telephone lines 24. Instead, when each family member enters the home, the family member may dock his or her cellular telephone 14 in the docking station 12 that may be located near an entrance of the house, for example. A telephone call to any of the docked cellular telephones 14 results in the communication of a ringing signal to one of the internal telephone lines of the wired telephone network 16 and thus, causes one of the wired telephone devices 18 to generate a unique audible ringing sound.

As an example, in some embodiments of the invention, each docking bay 13 (see FIG. 2) may be associated with a particular internal telephone line of the wired telephone network 16, and in some embodiments of the invention, several docking bays 13 may be associated with the same internal telephone line. In some embodiments of the invention, when more than one docked cellular telephone 14 shares the same internal telephone line, the docking station 12 ensures that when one of these cellular telephones 14 receive a call, the docking station 12 generates a ring signal that has a distinctive ring pattern for purposes of identifying the cellular telephone 14 that is ringing to members of the house. Besides receiving calls through the cellular telephones 14, outgoing calls may be placed through the cellular telephones 14. In this manner, when one of the wired telephone devices 18 is taken off hook, the docking station 12 selects (in a manner described below) one of the cellular telephones 14 and uses the selected cellular telephone 14 to establish communication with the base station 20.

As another example, the docking station 12 may be used in the following scenario for business use. The docking station 12 may be connected into an analog port of a PBX system of the wired telephone network 16 or may be connected by logic to the PBX system 16, as examples. Salespersons may each have an associated cellular telephone 14 and a corresponding cellular telephone number. Thus, the same telephone number may be used to reach the salesperson, regardless if the salesperson is in or out of the office. When the salesperson returns to the office, the salesperson may dock his or her cellular telephone in the docking station 12. When one of the docked cellular telephones 14 receives a call, the docking station 12 routes the call (via the wired telephone network 16) to the wired telephone device 18 at the extension of the salesperson. For outgoing calls, the PBX switch may select one of the cellular telephones 14 (pursuant to a predefined hunt order, for example) that is not busy and use the selected cellular telephone 14 to place the outgoing call.

Thus, the advantages of using the docking station in the arrangements that are described herein may include one or more of the following: cellular pricing may be achieved while using wired telephone devices; a single telephone number may be used to call both a cellular and a wired telephone; a cellular telephone does not have to be carried in areas that are already serviced by a wired telephone network; and additional telephone channels may be added rapidly. Other advantages are possible.

Figure 3:
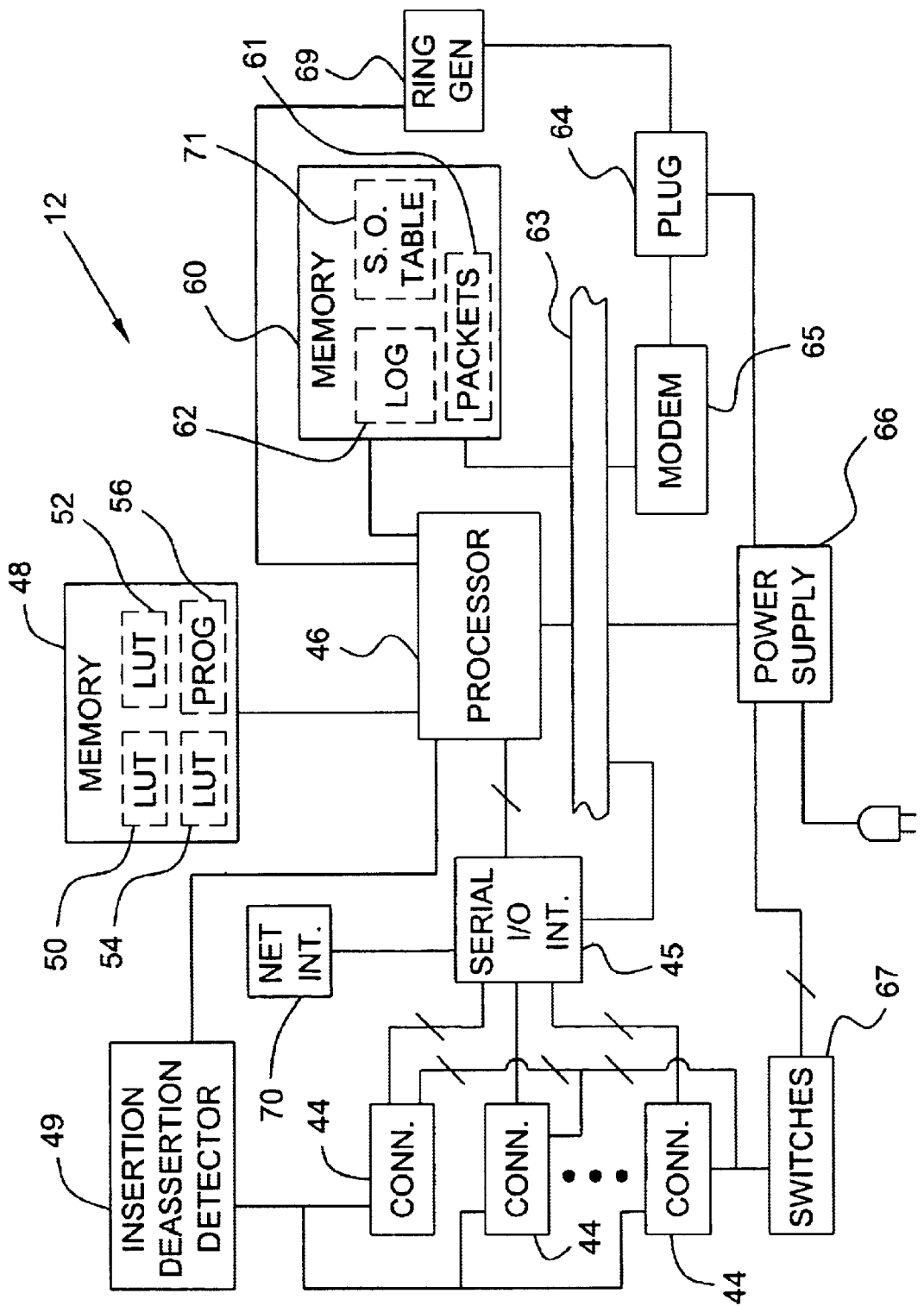
FIG. 3 is a schematic diagram of the electrical circuitry docking station according to an embodiment of the invention.

FIG. 3 depicts a possible embodiment of the docking station 12 according to an embodiment of the invention, although variations and different implementations of the docking station 12 are possible. The docking station 12 includes multiple pin connectors 44, each of which is constructed to receive and form electrical connections with a port (a serial port, for example) of a different cellular telephone 14. In this manner, in some embodiments of the invention, the docking station 12 includes an insertion/removal detection circuit 49 that detects when a particular cellular telephone 14 is docked in one of the docking bays 13. This detection may be accomplished in numerous different ways, such as an arrangement where the cellular telephone 14 forms a current conduction path between two of its connector pins when the cellular telephone 14 is inserted into the connector 44, for example. Likewise, the circuit 49 may use the absence of the current conduction path to detect removal of a particular cellular telephone 14 from the docking station 12. Regardless of the technique that is used to detect insertion/removal of the cellular telephones 14, the circuit 49 communicates all changes in the connection/removal status to a processor 46 that takes the appropriate action based on the indicated change.

In some embodiments of the invention, the processor 46 may use a more direct approach to sense insertion/removal of the cellular telephones 14. In this manner, the processor 46 may periodically attempt to communicate (using a predefined communication protocol) with each of the connectors 44 for purposes of communicating with any cellular telephones 14 that are connected to the connectors 44. In this manner, the processor 46 may use this communication to track the insertion/removal of the cellular telephones 14. To accomplish this, the processor 46 may use a serial input/output (I/O) interface 45 that is coupled between the processor 46 and the connectors 44 for purposes of establishing a communication link with the cellular telephones 14.

When the processor 46 determines that a cellular telephone 14 has been recently inserted if into a connector 44, the processor 46, in some embodiments of the invention, uses a predefined communication protocol to retrieve configuration information from the docked cellular telephone 14. This configuration information, in turn, may indicate, as examples, the manufacturer of the cellular telephone 14; the model number of the cellular telephone 14; a protocol to be used when communicating with the cellular telephone 14; and commands to be used when communicating with the cellular telephone 14. The processor 46 may use the configuration information for purposes of communicating with the cellular telephone 14 and retrieving information from the cellular telephone 14. For example, the processor 46 may use the configuration information to determine a protocol to be used to retrieve a rate schedule for the cellular telephone 14 and a protocol to be used to retrieve a log of the incoming and outgoing minutes that have been used by the cellular telephone 14 in the current billing period. The rate schedule may define, for example a lower rate for a predefined contracted number of minutes during the current billing period and a higher rate for any usage time that exceeds the contracted number of minutes. As another example, the processor 46 may use the configuration information to determine a protocol to be used when retrieving stored telephone numbers from the cellular telephone 14.

Thus, as described above, in some embodiments of the invention, the docking station 12 may use a "plug and play" technique to automatically adapt to the docking of a cellular telephone 14. The docking station 12 may include a memory 48 (a FLASH memory, an electrically erasable programmable read only memory (EEPROM) or a random access memory (RAM), as examples) to store a look-up table (LUT) 50 that includes multiple entries that are indexed by different identifies that are assigned to the different connectors 44. Each entry, in turn, indicates the configuration information for the corresponding cellular telephone 14 and may be used by the processor 46 to establish the proper procedure and commands to be followed when communicating with the cellular telephone 14.

The docking station 12 also includes a telephone line plug 64 (an RJ-11 compatible plug, for example) that plugs into a wall jack of a residential telephone system, an analog port of a PBX system for a business system, or logic that is coupled to the PBX system, as examples (i.e., plugs the docking station 12 into the wired telephone network 16). Because the external telephone lines 24 are disconnected from the PSTN 30, in some embodiments of the invention, the docking station 12 includes features to emulate plain old telephone system (POTS) signaling that would otherwise be provided by the PSTN 30 if the telephone lines 24 were connected to the PSTN 30. For example, the docking station 12 may include a power supply 66 that plugs into an electrical receptacle and provides a DC voltage (−48 volts DC, for example) to the telephone lines 24. The docking station 12 also includes a ring generator 69 that, when directed to do so by the processor 46, generates a ring signal within the wired telephone network 16. In some embodiments of the invention, the processor 46 controls the power supply 66 to regulate the on hook and off hook signaling that is associated with the POTS protocol. The power supply 66 may also be used to charge the cellular telephones 14 that are not currently active but are docked in the docking station 12. In this manner, the processor 46 may selectively activate switches 67 to route a charging voltage from the power supply 66 to the inactive cellular telephones 14. In some embodiments of the invention, the power supply 66 may use the batteries of one or more of the docked cellular telephones 14 to power the docking station 12 in the event that an interruption occurs to the power that is received by the power supply 66.

For purposes of communicating information between the wired telephone devices 18 and the cellular telephones 14, the docking station 12 includes a modem 65 that is coupled to the jack plug 64 and an internal bus 63. In this manner, the modem 65 decodes information from the wired telephone network 16, regardless of whether the wired telephone network 16 is providing an analog signal that indicates voice information or a modulated analog signal that indicates data (data that is generated by another modem, for example). The data that is provided by the modem 65 may be, in some embodiments of the invention, communicated to a memory 60 (a RAM, for example) that is coupled to the bus 63. The processor 46 may package the data into cellular telephone packets 61 that are communicated from the memory 60 to the serial I/O interface 45 for purposes of communicating the packets 61 to the currently active cellular telephone 14. In some embodiments of the invention, the modem 65 decodes dual tone multiple frequency (DTMF) tones that may be entered on keypads of the wired telephone devices 18 to derive a telephone number that is communicated to one of the docked cellular telephones 14 for purposes of placing an outgoing call.

In some embodiments of the invention, the modem 65 may also communicate with the cellular telephone 14 that is receiving a call to receive a caller identification (ID) name and number. In this manner, the modem 65 converts this information into the appropriate signaling format and communicates this information to the wired telephone network 16. If a call is already established, then, in some embodiments of the invention, the modem 65 communicates the caller ID information in accordance with a call waiting format.

The information flow from the currently active cellular telephone 14 back to the wired telephone network 16 occurs over essentially a reverse path to the path that is described above. In this manner, packets that are received from the serial I/O interface 45 are communicated via the bus 63 into the memory 60. The processor 46 may then transfer the data into the modem 65 that converts the data into an analog signal (a modulated analog signal to communicate digital data or a lower frequency analog signal to communicate voice information) that the modem 65 furnishes to the wired telephone network 16.

Among the other features of the docking system 12, the processor 46 may access other look-up tables (LUTs) that are stored in the memory 48. For example, a ring pattern LUT 52 may include an entry for each cellular telephone 14. Each entry, in turn, may indicate a ring pattern to be used for each docked cellular telephone 14. Therefore, before causing a ring signal to be generated on the wired telephone system 16, the processor 46 retrieves an indication of the appropriate ring pattern from the LUT 52 and controls the ring generator 69 accordingly. As example of another feature of the docking station 12, another LUT 50 may be stored in the memory 48 to indicate the billing information (rate schedule, for example) for each docked cellular telephone 14. In this manner, the processor 46 may periodically retrieve the logged time from each docked cellular telephone 14 and store the time in a log 62 that may be stored, for example, in the memory 60. Before using one of the cellular telephones 14 to place an external call, the processor 14 may retrieve the logged time from the memory 60 and compare the logged time to the rate schedule (that is indicated by the LUT 50) for purposes of determining which cellular telephone 14 may be used to establish the lowest cost call.

Figure 4:
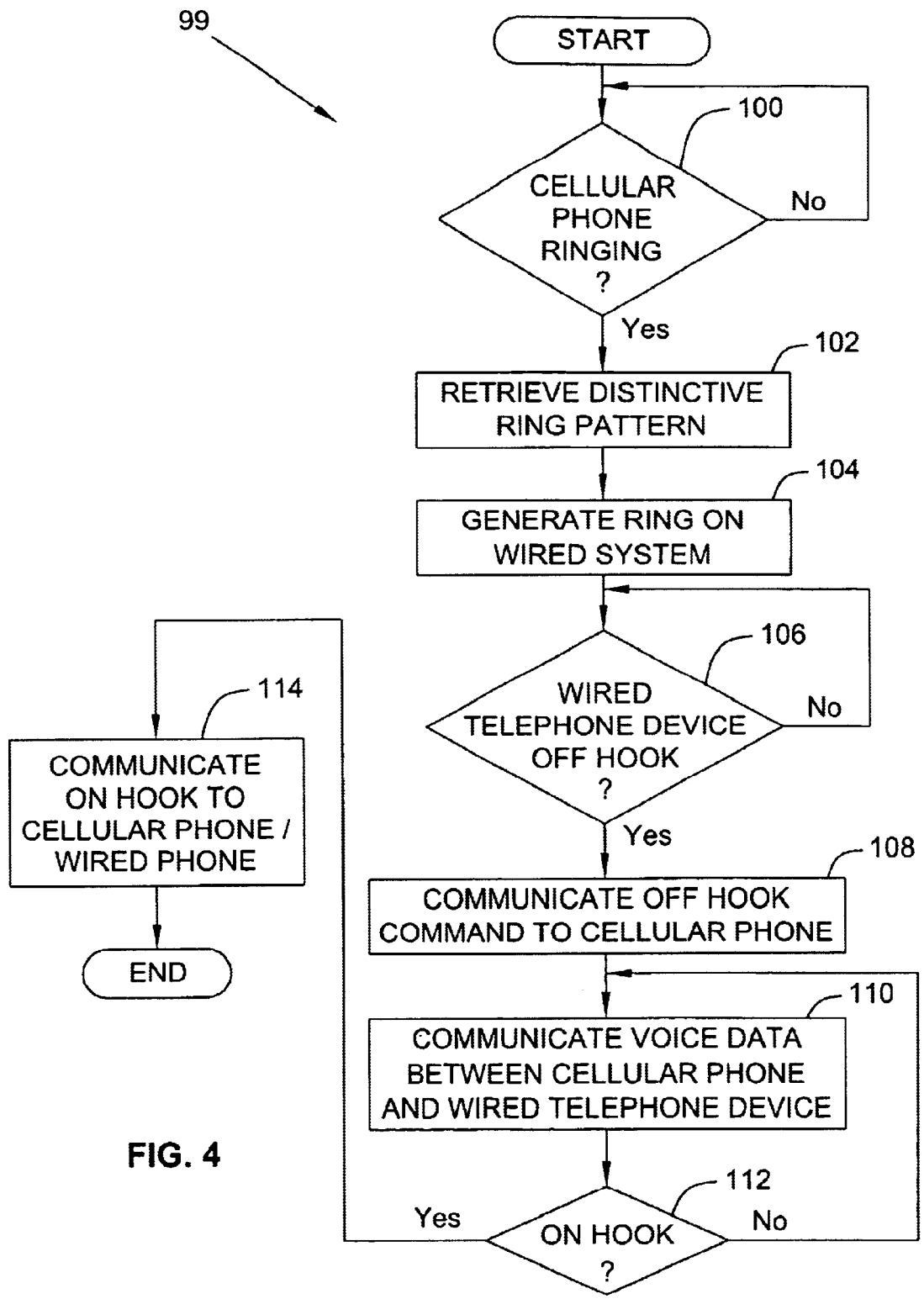
FIGS. 4, 5 and 6 are flow charts illustrating different algorithms executed by a processor of the docking station of FIG. 2 according to embodiments of the invention.

For purposes of communicating information from one of the cellular telephones 14 to the wired telephone network 16, in some embodiments of the invention, the processor 46 may execute a program 56 (that is stored in the memory 48, for example) to perform a technique 99 that is depicted in FIG. 4. More particularly, the technique may cause the processor 46 to determine (block 100) whether one of the cellular telephones 14 is ringing. To accomplish this, the ringing cellular telephone 14 may communicate a packet message to the processor 46 to alert the processor 46 that the cellular telephone 14 is ringing. However, in other embodiments of the invention, the cellular telephone 14 that is ringing may assert an interrupt pin on the processor 46 to alert the processor 46 that one of the cellular telephone 14 is ringing. Upon this occurrence, the processor 46 may poll the cellular telephones 14 to determine which cellular telephone 14 is ringing. In other embodiments of the invention, the docking station 12 may include vibration or audio sensors that are placed in the different docking bays 13 so that the processor 46 may detect when a particular cellular telephone 14 is ringing (or vibrating, depending on the ring setting on the particular cellular telephone 14).

After the processor 46 determines that one of the cellular telephone 14 is ringing, then the processor 46, in some embodiments of the invention, retrieves (block 102) an indication of a distinctive ring pattern that is associated with the cellular telephone 14. For example, the processor 46 may retrieve the indication of this ring pattern from the look-up table (LUT) 52 that is stored in the memory 48. In other embodiments of the invention, the processor 46 may not use a distinctive ring pattern for the different cellular telephones 14.

Once an indication of the distinctive ring pattern is retrieved (if any), the processor 46 communicates with the ring generator 69 to generate (block 104) a ring signal on the wired telephone network 16. The processor 46 subsequently waits for one of the telephone devices 18 to go off hook.

In this manner, the processor 46 monitors the internal telephone lines of the wired telephone network 16 to detect a change in the DC voltage levels of the lines to determine (diamond 106) whether one of the telephones 18 is off hook. When this occurs, the processor 46 communicates (block 108) an off hook signal (via a message packet) to the cellular telephone 14 that is ringing.

Once the cellular telephone 14 is taken off hook, the processor 46 facilitates the communication (block 110) of information between the currently active cellular telephone 14 and the wired telephone network 16 until the processor 46 determines (diamond 112) that either the cellular telephone 14 or all of the wired telephones 18 that are connected to the active internal telephone line are on hook. On this occurrence, the processor 46 communicates (block 114) an on hook signal to the cellular telephone 14 and to the appropriate internal line of the wired telephone system 16.

Figure 5:
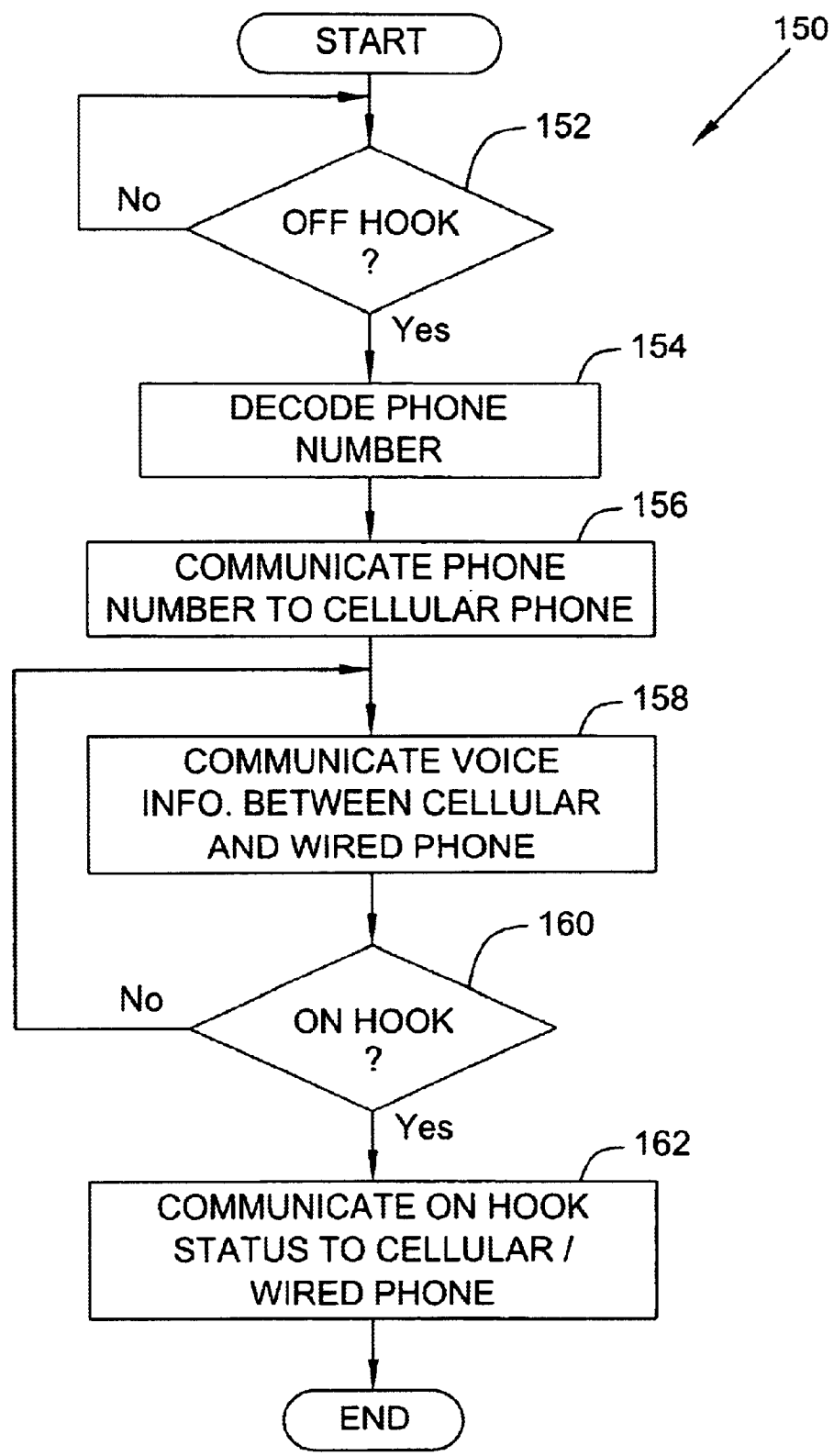

In some embodiments of the invention, the program 56 may cause the processor 46 to perform a technique 150 that is depicted in FIG. 5 for purposes of placing a call from one of the wired telephone devices 18. In this manner, the technique 150 may cause the processor 46 to determine (diamond 152) whether one of the wired telephones 18 is off hook. If so, then the processor 46 uses the modem 65 to decode (block 154) the phone number that is entered on the wired telephone 18 (via the DTMF tone signals) that is off hook and communicate (block 156) the phone number to a selected one of the cellular phones 14.

Next, the processor 46 establishes communication (block 158) of information between the wired telephone device 18 and the cellular telephone 14 that is being used to place the call. This communication continues until the processor 46 determines (diamond 160) whether either the wired telephone device 18 is placing the call or the telephone at the receiving end of the call has been placed on hook. Upon this occurrence, the processor 46 communicates (block 162) an on hook signal to both the wired telephone device 18 and the cellular telephone 14 that is placing the call.

Figure 6:
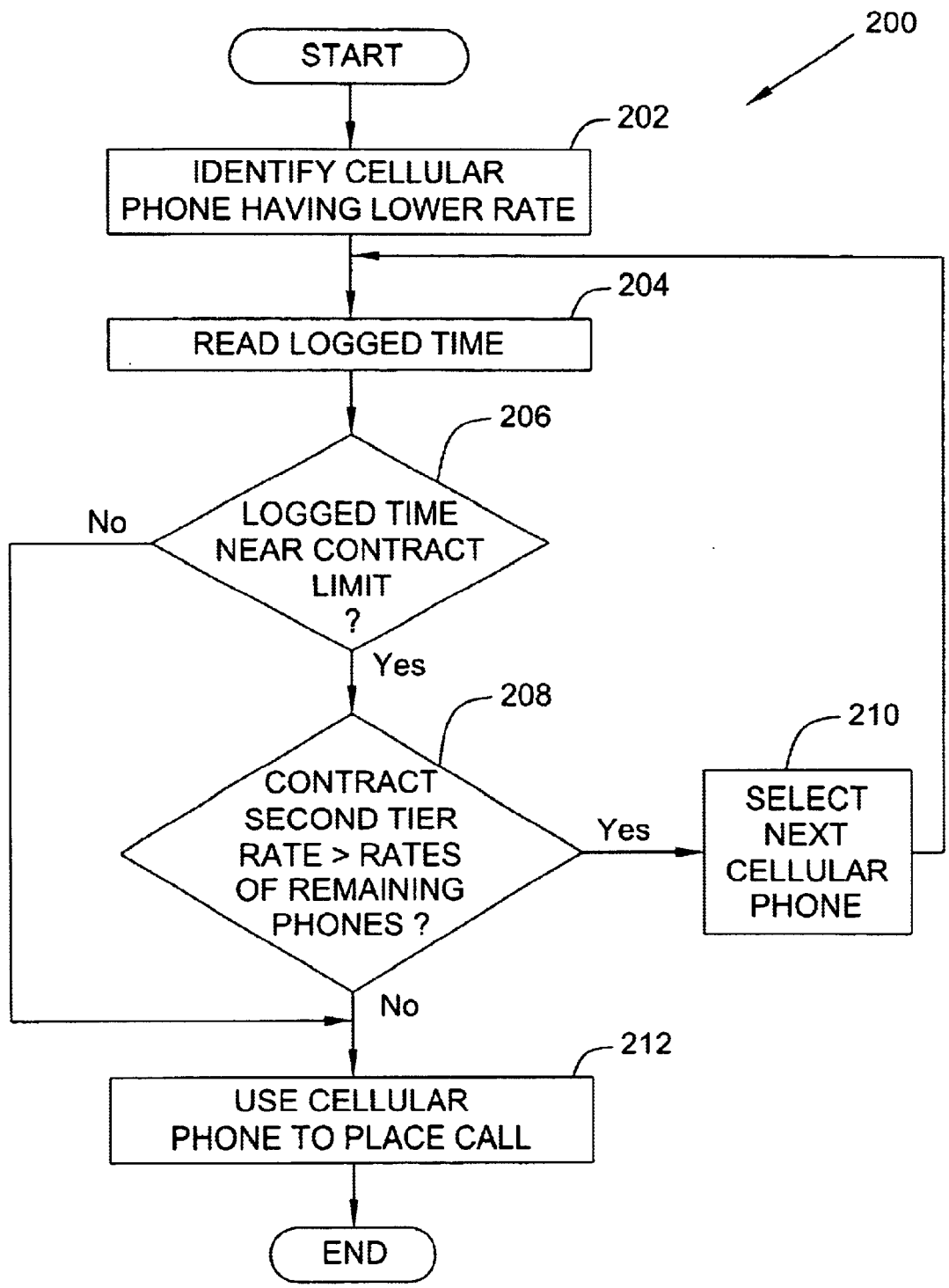

In some embodiments of the invention, the program 56 may cause the processor 46 to perform a technique 200 (depicted in FIG. 6) to select which cellular telephone 14 is used to place an outgoing call. In this manner, the technique 200 may cause the processor 46 to identify (block 202) the cellular telephone 14 that has the lowest rate. This determination may be based on, for example, an examination of the logged time (via the log 62 that is stored in the memory 60, for example) and the rate plans that is associated with the cellular telephones 14. In this manner, the processor 46 may read (block 204) the logged time from the log 62 that is stored in the memory 60. Next, the processor 46 may determine (diamond 206) whether the logged time is near the contract limit that is associated with the cellular telephone 14. If so, then the processor 46 determines (diamond 208) whether the second tier rate is greater than the lower two rates of the remaining cellular telephones 14. If so, then the processor 46 selects (block 210) the next cellular telephone 14 for analysis and returns to block 204. Otherwise, the processor 46 has located the lowest rate for this call and uses (block 212) this cellular telephone 14 to place the outgoing call.

Other arrangements are possible. For example, in some embodiments of the invention, the processor 46 may communicate with the docked cellular telephones 14 to access speed dial tables that are stored in the memories of the cellular telephones 14. In this manner, the processor 46 may then store the numbers and names from the speed dial memories in a table 71 that is stored in the memory 60. As an example, the caller ID information from the cellular telephone 14 may include the number and not the name of the calling party. However, the processor 46 may look up the name (if stored) in the table 71 and provide this missing information that the modem 65 then forwards along with the number to the wired telephone network 16.

Figure 7:
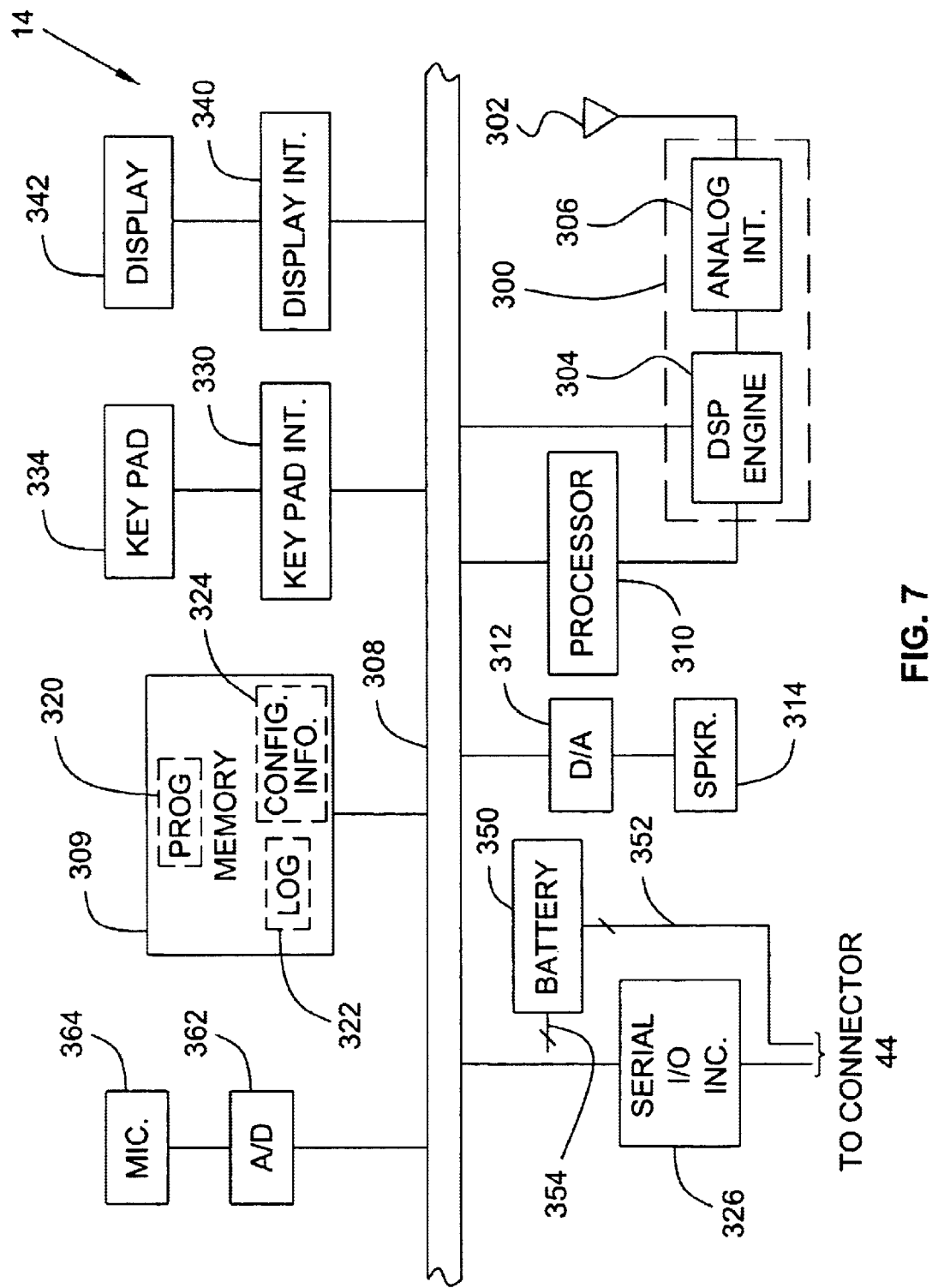
FIG. 7 is a schematic diagram of a cellular telephone according to an embodiment of the invention.

Referring to FIG. 7, in some embodiments of the invention, the cellular telephone 14 includes a transceiver 300 that serves as an interface of the cellular telephone 14 to a cellular antenna 302. In this manner, the transceiver 300 includes an analog interface 306 to communicate analog signals with the antenna 302 and provide digital data to a digital signal processing (DSP) engine 304 that decodes received and encodes outgoing data. The DSP engine 304 is coupled to a bus 308 of the cellular telephone 14 to communicate data with a memory 309 (of the cellular telephone 14). A processor 310 is also coupled to the bus 308 to direct the communication of data between the memory 309 and the transceiver 300. In this manner, when incoming data is received, the processor 310 transfers the data from the memory 309 to a digital-to-analog converter 312 to a speaker 314 to play the received packet. Similarly, the processor 310 directs captured voice data from a microphone 364 through an analog-to-digital (A/D) converter 362 to the memory 309 and forms the corresponding packets in the memory 309 before transferring the packets to the transceiver 300.

The cellular telephone 14 also includes a serial input/output (I/O) interface 326 that establishes electrical connection with the connector 44. In this manner, the serial I/O interface 326 may receive request packets from the connector 44, and these requests packets are stored in the memory 309. The processor 310 may execute a program 320, for example, to aid the processor 310 in processing these requests. For example, the processor 310 may receive a request to furnish configuration information 324 that is stored in the memory 309, retrieve a log 322 of the usage time of the cellular telephone 14 and retrieve a stored telephone number, as examples.

Among the other features of the cellular telephone 14, a key pad 334 may be used to enter telephone numbers and may be interfaced between the bus 308 via a key pad interface 330. Furthermore, the processor 310 may drive a display 342 through a display interface that is coupled between the display 342 and the bus 308. The cellular telephone 14 also includes a battery 350 that is coupled to conductive traces, or lines 354, to supply power to the components of the cellular telephone and is coupled to conductive traces, or lines 352, that extend to and are accessible through the connector 44. The lines 352 may be used for purposes of charging the battery 350 and for purposes of supplying power to the docking station 12 in the event that power that is received by the power supply 66 is interrupted. Other arrangements are possible for the cellular telephone 14.

Other embodiments are within the scope of the following claims. For example, in some embodiments of the invention, the docking station 12 may include a network interface 70 (see FIG. 3), such as an Ethernet interface card, for example, that connects the docking station 12 to a local area network (LAN), for example. Due to this arrangement, devices of this network may use one of the docked cellular telephones to tap into the cellular network and use the cellular network as an Internet service provider (ISP), for example. In this manner, one of the docked cellular telephones 14 may retrieve information from an Internet site that is designed to communicate with the cellular telephone 14 and communicate this information to the network interface 70. The network interface 70 may also be used to, for example, establish a terminal connection to observe the status of the docking station 12 or change the above-described look-up tables and/or programs. More particularly, the network interface 70 may be used to couple a network terminal that has a keyboard and terminal to the docking station, and this network terminal may be used to program, observe and/or perform maintenance on the docking station 12. As yet another example, the Internet may be used to access the docking station 12 for maintenance, observation and programming purposes using the ISP arrangement that is described above. Thus, for this arrangement, the docking station 12 has an Internet Protocol (IP) address.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A docking station comprising:
    connectors, each connector to receive a different cellular telephone; and
    a circuit to select one of the cellular telephones based on a predetermined selection criteria and cause the selected cellular telephone to communicate for a wired telephone device of a wired telephone network with another telephony device.

2. The docking station of claim 1, wherein the wired telephone device comprises a telephone.

3. The docking station of claim 1, wherein the wired telephone device comprises a modem.

4. The docking station of claim 1, wherein the circuit is adapted to select the cellular telephone based on the cellular telephone having the lowest rate and using the cellular telephone with the lowest rate.

5. The docking station of claim 1, wherein the circuit is further adapted to receive configuration information from the one or more cellular telephones that are connected to the connectors.

6. The docking station of claim 1, wherein the circuit is generates a ring signal that is communicated to the wired telephone network in response to a call received by one of the cellular telephones and controls the ring signal to associate each cellular telephone with a different ring pattern.

7. The docking station of claim 1, wherein the circuit comprises:
    a processor; and
    a memory storing program to cause the processor to communicate information between said at least one the cellular telephones and the wired telephone network.

8. The docking station of claim 1, wherein the circuit communicates caller ID information between said at least one of the cellular telephones and the wired telephone device.

9. The docking station of claim 1, wherein the circuit communicates speed dial information between said at least one of the cellular telephones and the wired telephone device.

10. The docking station of claim 1, wherein the circuit comprises an interface to establish communication between the circuit and a network.

11. The docking station of claim 1, wherein the circuit comprises a power supply to use power from at least one of the cellular telephones to power the docking station in the event that power that is received by the power supply is interrupted.

12. A method comprising:
    providing different connectors to receive different cellular telephones;
    selecting one of the cellular telephones based on a predetermined selection criteria; and
    using the selected cellular telephone to communicate for a wired telephone device of a wired telephone network with another telephony device.

13. The method of claim 12, wherein the wired telephone device comprises a telephone.

14. The method of claim 12, wherein the wired telephone device comprises a modem.

15. The method of claim 12, wherein the selecting comprises:
    determining the cellular telephone having the lowest rate and selecting the cellular telephone having the lowest rate.

16. The method of claim 1, further comprising:
    receiving configuration information from the one or more cellular telephones that are connected to the connectors.

17. The method of claim 12, further comprising:
    generating a ring signal that is communicated to the wired telephone network; and
    controlling the ring signal to associate each cellular telephone with a different ring pattern.

18. The method of claim 12, further comprising:
    communicating caller ID information between said at least one of the cellular telephones and the wired telephone device.

19. The method of claim 12, further comprising:
    communicating speed dial information between said at least one of the cellular telephones and the wired telephone device.

20. An article comprising a computer readable storage medium storing instructions to cause a processor to:
    detect the insertion of cellular telephones in a docking base station;
    select one of the cellular telephones based on a predetermined selection criteria; and
    based on the selection, use the selected cellular telephone to establish communication for a wired telephone device of a wired telephone network with another telephony device.

21. The article of claim 20, wherein the wired telephone device comprises a telephone.

22. The article of claim 20, wherein the wired telephone device comprises a modem.

23. The article of claim 20, wherein the storage medium stores instructions to cause the processor to select the cellular telephone having the lowest rate and use the cellular telephone with the lowest rate.

24. The article of claim 20, wherein the storage medium stores instructions to cause the processor to receive configuration information from one or more of the cellular telephones that are connected to the docking base station.

25. The article of claim 20, wherein the storage medium stores instructions to cause the processor to, in response to a call being received by one of the cellular telephone, use a look up table to associate the cellular telephone receiving the call with a ring pattern.

* * * * *

UNITED STATES PATENT AND TRADEMARK OFFICE
CERTIFICATE OF CORRECTION

PATENT NO. : 6,704,580 B1
DATED : March 9, 2004
INVENTOR(S) : James Steven Fintel It is certified that error appears in the above-identified patent and that said Letters Patent is hereby corrected as shown below:

Column 9,
Line 29, delete "is".

Signed and Sealed this

Sixth Day of July, 2004

JON W. DUDAS
*Acting Director of the United States Patent and Trademark Office*